United States Patent Office 2,932,614
Patented Apr. 12, 1960

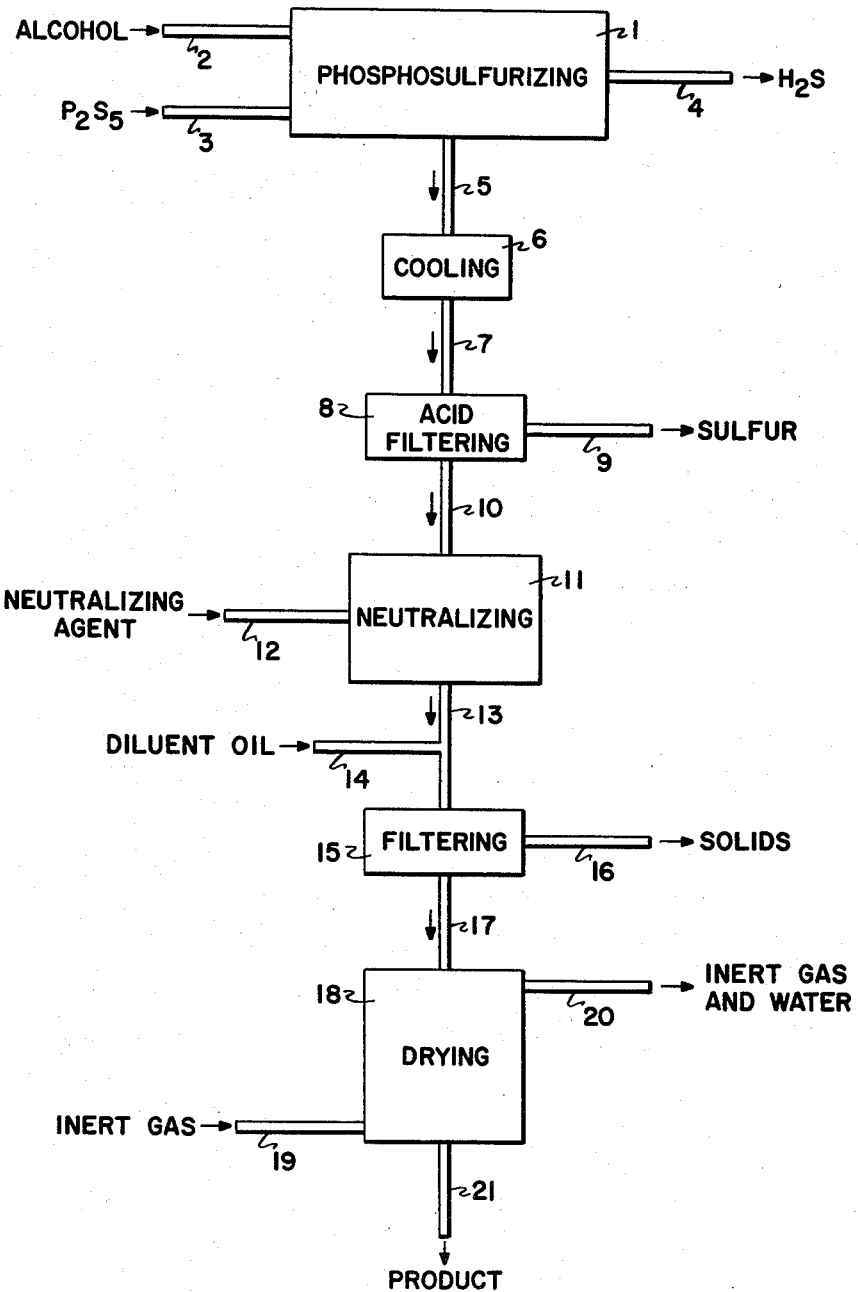

2,932,614

MANUFACTURE OF METAL SALTS OF DIALKYL DITHIOPHOSPHORIC ACIDS AND CONCENTRATE IN OIL SOLUTION

Charles S. Lynch, Plainfield, and Richard F. Finn, Cranford, N.J., assignors to Esso Research and Engineering Company, a corporation of Delaware Application January 7, 1958, Serial No. 707,633

4 Claims. (Cl. 252—32.7)

This invention is concerned with the manufacture of metal salts of dialkyl dithiophosphoric acids. This type of salt is useful in lubricants as an antioxidant and extreme pressure agent, and is a corrosion inhibitor for copper-lead bearings.

Zinc dialkyl dithiophosphates and similar salts are used extensively in automotive oils, industrial oils, hypoid gear oils, and in automatic transmission fluids, primarily to impart oxidation resistance and/or extreme pressure properties to the lubricant. The manufacture of a satisfactorily clear, odorless, and stable concentrate of such salts has been found to be difficult in the past and to be sensitive to processing conditions. The process of the present invention assures the production of concentrates of dialkyl dithiophosphoric acid metal salts of the requisite quality for their intended use.

This invention will become clear from the following examples and description of the drawing which forms a part of this specification.

The drawing schematically illustrates a process designed according to the teachings of this invention.

In brief compass, the present process comprises forming a dialkyl dithiophosphoric acid by reacting an alcohol with phosphorus pentasulfide while controlling the reaction to assure the final acid color is darker than amber. The dark colored acid so obtained is then cooled to facilitate separation of solid material, such as free sulfur. This solid material is removed as by decanting or filtration, and the acid is then neutralized with an oxide or hydroxide of a metal, preferably of zinc. The neutralization is carried out at a temperature below the boiling point of water, so that the water of neutralization remains in the reaction mixture. After neutralization, the water containing reaction mixture is heat soaked. It is then preferably, but not necessarily, diluted with a suitable oil to facilitate filtering. The heat soaked salt is filtered while still containing the water of neutralization to remove substantially completely all inorganic salts. The filtered material is then dried to obtain the finally desired clear, odorless, and stable concentrate of the dialkyl dithiophosphoric acid salt.

The process of this invention involves three important features:

The dark colored acid is directly neutralized with a neutralizing agent of the metal desired in the final product, under conditions selected to assure that the water of neutralization is retained.

The heat soaking of the neutralized acid in the presence of water is also an important determinant of the quality of the final product.

The sequence of steps is also important, i.e., the heat soaked salt is filtered before it is dried.

Alcohols, including glycols, having in the range of 1 to 14 carbon atoms per molecule are used to form the dialkyl dithiophosphoric acid. Examples of suitable alcohols are methanol, ethanol, butanol, isobutanol, isopropanol, cyclohexanol, methyl isobutyl carbinol, 2-ethyl hexanol, methyl cyclohexanol and primary branched chain alcohols such as $C_5$, $C_7$ or $C_{13}$ "Oxo" alcohols. Glycols such as 1,3-propylene glycol can be used. The glycols used are those wherein the hydroxyl groups are on non-adjacent carbon atoms. When a glycol is used, one mole of it is the molar equivalent of two moles of a monohydric alcohol. $C_3$–$C_{14}$ monohydric aliphatic alcohols are preferred, and mixtures of two monohydric alchols having in the range of 3 to 6 carbon atoms per molecule are especially preferred. The use of a mixture permits the use of one of the cheaper lower molecular weight alcohols, while still maintaining the requisite oil solubility. Examples of suitable mixtures are isopropanol-methyl isobutyl carbinol, and isobutyl alcohol-primary amyl alcohols. While dialkyl dithiophosphates can be made from individual alcohols and then mixed, it is much preferred to react mixtures of alcohols so that a predominant proportion of the product contains a phosphate molecule having two different alkyl groups.

The phosphosulfurizing agent used is phosphorus pentasulfide. The quality of the phosphorus pentasulfide is of some importance and this reagent should meet the following standards:

| | |
|---|---|
| Melting point, ° F. | 270–280 |
| Wt. percent phosphorus | 25–30 |
| Wt. percent sulfur | 70–75 |
| Free of organic material. | |

The neutralizing agent used is a basic inorganic compound such as an oxide or hydroxide of a metal forming electro-valent or co-valent bonds, or from the series of transition elements. Useful metals are magnesium, calcium, aluminum, manganese, iron, cobalt, nickel, copper, barium and lead. Metals of group II are preferred. Zinc is particularly preferred because its dialkyl dithiophosphates are outstanding in imparting the desired antioxidant, anticorrosive and extreme pressure properties.

In the range of 5 to 20 weight percent of a diluent oil is preferably added after the neutralization and heat soaking steps to form a concentrate of the salt in oil solution that can be blended later on with lubricating oils. The diluent oil is desirably a distillate oil of 35 to 45 SUS at 210, and 60 to 110 viscosity index.

Referring to the drawing, the alcohol or mixture of alcohols and the phosphorus pentasulfide are admitted at appropriate rates to reaction zone 1 by lines 2 and 3 respectively. Reaction zone 1 is an appropriate reactor for carrying out phosphosulfurization reactions, preferably but not necessarily a glass-lined vessel fitted with suitable agitation equipment. All of the alcohol can be charged at once if desired, followed by continuous addition of the phosphorus pentasulfide until the requisite amount is reached. The hydrogen sulfide evolved is removed from zone 1 by line 4. Preferably line 4 is fitted with a reflux condenser to prevent alcohol loss. The temperature and the termination point of the reaction are controlled so that a satisfactory dark acid product is obtained from this step. The temperature is preferably maintained in the range of 160 to 200° F. The specific gravity of the reaction mixture gives a convenient indication of the progress of the reaction. If the reaction goes too far and a straw colored acid is obtained, then this results in an ultimate product that is hazy and unstable.

The dark acid product so produced is removed by line 5 and cooled in zone 6, which is, for example, a tube and shell heat exchanger. The product can be cooled in zone 1 if it is a jacketed kettle. Any adequate heat exchange medium such as cool water or hexane can be used for cooling. The cooled acid is passed by line 7 to zone 8 wherein free sulfur and other solids are removed, as by decanting, centrifuging, or filtering in a plate and frame filter press or rotary filter of suitable size. The sulfur and other solids so separated are removed by line 9.

The solids-free acid is transferred by line 10 to neutralization zone 11, which is a reactor similar to that described for zone 1. The same equipment can be used provided it is first thoroughly cleaned to remove $P_2S_5$, sulfur, and other by-products of the $P_2S_5$-alcohol reaction. The desired amount of neutralizing agent is supplied to zone 11 at a controlled rate by line 12. Preferably the reaction mixture in zone 11 is substantially free from other inert or diluent material. Conditions are adjusted such that the water of neutralization remains in the reaction mixture. To obtain a satisfactory product, it is desirable to control the reaction responsive to the pH of the mixture, the best product being obtained at a pH of 6.0 to 6.6, preferably 6.0 to 6.2.

After neutralization is complete, the water content is adjusted if necessary to be in the range of 0.5 to 4 weight percent and the water containing reaction mixture is heat soaked at 150 to 200° F. for about 1 to 4 hours to aid in the removal of haze precursors, to precipitate insoluble by-products and to improve the hydrolytic stability of the final product.

After this heat soaking, the water-containing reaction mixture is removed from zone 11 by line 13 and is admixed with a diluent oil if desired, supplied by line 14. The solids material in the neutralized and diluted product is then removed in zone 15. Zone 15 comprises separating means similar to that described for zone 8. The same equipment can be used if it is thoroughly cleaned after handling the acid. The separated solid material is removed by line 16. During this separation step, the water content of the diluted and neutralized acid is maintained in the range of 0.5 to 4 weight percent to facilitate the removal of the solids. The solids-free oil concentrate is passed by line 17 to drying zone 18, here shown as being an inert gas stripping zone although other means of drying can be used, such as azeotroping as with benzene or isobutyl alcohol, or entrainment with light hydrocarbons such as hexane. When stripping with gas, it is desirable to use an inert gas that is substantially free of free oxygen, i. e., contains less than one volume percent oxygen. The stripping gas is admitted to zone 18 by line 19, passes through the oil concentrate removing water, and the water containing inert gas is removed by line 20. The dry oil concentrate product, having a water content of less than 1.0 weight percent, preferably less than 0.5 weight percent, is removed by line 21.

The following table conveniently summarizes the material conditions of a preferred process of this invention wherein a zinc diaklyl dithiophosphate is formed from a mixture of two $C_3$-$C_6$ monohydric alcohols. A specific example thereof is also given.

TABLE I

| Reactants | Range | Example |
|---|---|---|
| Alcohol | Mixture of monohydric alcohols, 3-6 carbon atoms. | 70 wt. percent methyl isobutyl carbinol, 30 wt. percent isopropanol. |
| Phosphosulfurizing agent | $P_2S_5$, 25 to 30% phosphorus | $P_2S_5$. |
| Neutralizing agent | Zinc oxide or hydroxide | ZnO. |
| Phosphosulfurizing Conditions: | | |
| Temperature, °F | 160 to 200 | 190. |
| Ultimate moles $P_2S_5$/mole alcohol | 0.225 to 0.275 | 0.263. |
| Time to completion, hrs | 1 to 6 | 2. |
| Inerts or diluents | less than 5 wt. percent | None. |
| Final acid viscosity, SSU at 100° F | 35 to 40 | 37.4. |
| Final acid Sp. Gr. at 78° F | 1.015 to 1.035 | 1.025. |
| Acid Filtering Conditions: | | |
| Temperature below which acid is cooled before filtering, °F. | 110 | 100. |
| Yield, mole acid/mole alcohol charged above | 0.45 to 0.5 | 0.48. |
| Filtered product, free sulfur content, wt. percent. | less than 2 | 0.5. |
| Final acid— | | |
| wt. percent S | 22 to 27 | 24.9. |
| wt. percent P | 10 to 13 | 11.8. |
| Neutralization Conditions: | | |
| Final temperature, °F | 140 to 200 | 185. |
| Ultimate moles neut. agent/mole acid | 0.52 to 0.60 | 0.55. |
| Time to complete neut. agent addition, min. | 5 to 60 | 10. |
| Heat Soaking Conditions: | | |
| Time, hrs | 1 to 4 | 3. |
| Temperature, °F | 150 to 200 | 185. |
| Inerts or diluents | less than 5 wt. percent | 1. |
| Final product— | | |
| pH | 6.0 to 6.6 | 6.1. |
| Water content, wt. percent | 0.5 to 4 | 2.5. |
| Product Filtering: | | |
| Diluent oil— | | |
| Type | Distillate | Distillate. |
| Amount, wt. percent | 5 to 20 | 15. |
| Vis. at 210° F., SSU | 35 to 45 | 40. |
| Temperature, °F | 140 to 200 | 185. |
| Product Drying: | | |
| Method | Inert gas stripping | Nitrogen. |
| Inert gas, percent $O_2$ | Substantially free of free oxygen | None. |
| Temperature, °F | 185 to 230 | 210. |
| Gas rate, s.c.g./hr./lb. product | 0.3 to 4 | 3. |
| Time to completion, hrs | 0.5 to 4 | 1. |
| Product water content, wt. percent | 0 to 0.5 | 0.05. |

See footnotes at end of table.

TABLE I—Continued

| Reactants | Range | Example |
|---|---|---|
| Product Characteristics: | | |
| Yield, mole percent on alcohol charged | 85 to 98 | 92. |
| Gravity | 1.18 to 1.20 | 1.195. |
| Appearance | Clear | Clear. |
| $H_2S$ Demerit [1] | 0 to 0.5 | 0. |
| Odor [2] | Satisfactory | Satisfactory. |
| Hydrolytic Stability,[3] °F | 200 to >250 | 250 (4 hours). |
| Decomposition temperature,[4] °F | 370 to 390 | 376. |
| Analysis— | | |
| Wt. percent P | 7.6 to 9.8 | 9.2. |
| Wt. percent S | 16.3 to 19.6 | 16.8. |
| Wt. percent C | 40 to 45 | 42.5. |
| Wt. percent H | 10 to 13 | 11.5. |
| Wt. percent O | 8.1 to 9.8 | 8.4. |
| Wt. percent Metal | 8.2 to 10.4 | 9.7. |
| Wt. percent $H_2O$ | Nil to 1.0 | <0.1. |

[1] The $H_2S$ demerit is determined by preparing a 5 wt. percent blend of the dialkyl dithiophosphate salt in lubricating oil, heating 175 gms. of the blend in an 8 oz. bottle for one hour at 100° F. in a suitable oven, and determining the extent of $H_2S$ evolution by placing a piece of Whatman #2 filter paper impregnated with lead acetate over the top of the bottle for five minutes. The color of the filter paper is compared with a standard and must not be more than 0.5—barely more than a perceptible coloration.

[2] The odor of the product is determined by an odor panel using a 2% solution of the compound in white oil. Satisfactory products are essentially odorless.

[3] The hydrolytic stability is determined by heating 20 gms. of the dialkyl dithiophosphate salt containing 2½ wt. percent water for four hours at various temperatures. An $H_2S$ demerit is then determined as described in [1]. This test is an indication of the stability of the product in storage and handling where water contamination is often experienced.

[4] The decomposition temperature is determined by heating the dialkyl dithiophosphate salt slowly in a Bunsen burner flame and noting the temperature at which rapid evolution of gas occurs. The test is an indication of product reactivity under conditions of high temperature.

Example

Approximately 662 grams of the product identified in the example of the above table were made. The phosphosulfurization was carried out in a 4-necked flask fitted with a stirrer, thermometer, and reflux condenser. The dark acid was filtered in a Büchner funnel, about 1 wt. percent of free sulfur being removed therefrom. The neutralization and heat soaking were carried out in the flask used to prepare the acid. The filtering of the salt after dilution was accomplished in a steam heated Büchner funnel, and the product was dried by blowing with nitrogen at 210° F. in a flask fitted with a sintered glass disperser.

This oil concentrate thus obtained was blended to form a lubricating composition. The base oil used in the formulation was derived from a Mid-Continent crude by solvent extraction. It had an SUS at 100° F. of about 160, and a viscosity index of about 114. In addition to the above zinc dialkyl dithiophosphate, 0.75 weight percent, the finished blend contained a V.I. improver (methacrylate type), a barium-calcium sulfurized phenate, calcium sulfate, and a phosphosulfurized pinene to make a finished multivis motor oil (10W–30 SAE Grade).

| | |
|---|---|
| Gravity, API | 30.1 |
| Vis/100° F. SUS | 325.8 |
| Vis/210° F. SUS | 65.2 |
| Viscosity index | 141 |
| Phosphorus, percent | [1] 0.091 |

[1] Base before ZDDP addition contained 0.032% phosphorus.

The lubricating oil blend so obtained was evaluated in the General Motors LS–5 Procedure. The valve lifter wear as determined by this test was on the average of 9 inches×$10^{-4}$, with the wear per lifter being in the range of 0 to 36 inches×$10^{-4}$. The cam wear obtained on the average was 6 inches×$10^{-4}$, and the range of wear for individual cams was 2 to 16 inches×$10^{-4}$. Only one valve lifter was pitted. This indicates that the zinc dialkyl dithiophosphate of this example imparts extreme pressure properties to lubricants.

The oxidation inhibition of the zinc dialkyl dithiophosphate of this example was tested in the CRC–L–4–545 Procedure extended for 72 hours. The oil blend tested was a finished 10W–20 SAE grade motor oil containing 0.58 weight percent of the phosphate. The base oil used was formed from 96.1% of a Mid-Continent solvent extract having a viscosity of 150 SUS at 100° F. and a viscosity index of 108, and 3.9% of a Mid-Continent bright stock having a viscosity of 150 SUS at 210° F. and a viscosity index of 100. In addition to the phosphate, the blend contained a polybutylene type viscosity index improver, a phosphosulfurized polybutylene neutralized with a basic barium nonyl phenol sulfide-sulfonate mixture as a detergent inhibitor, and a chlorinated wax-naphthalene condensate as a pour point depressant. The finished oil has the following inspections:

| | |
|---|---|
| Gravity, °API | 30.8 |
| Vis/100° F. SUS | 266.7 |
| Vis/210° F. SUS | 54.1 |
| Viscosity index | 126 |
| Phosphorus [1], wt. percent | 0.074 |

[1] Before addition of the phosphate, the blend had a phosphorus content of 0.026 wt. percent.

The bearing weight loss was only 63 milligrams in this test, and the piston varnish demerit was 0.19. This shows that the zinc dialkyl dithiophosphate imparts excellent oxidation inhibition to lubricating oils.

COMPARATIVE EXAMPLE I

The same procedure as described in the above example was used to prepare the same phosphate concentrate, except that the specific gravity of the acid mixture during the phosphosulfurization step was allowed to reach 1.04 by extending the reaction period to 2.5 hours and a straw colored product was obtained. The final oil concentrate product prepared from this straw colored acid was hazy and had an $H_2S$ demerit of 5.

COMPARATIVE EXAMPLE II

The same product was made in a manner identical to that in the example with the exception that the water of neutralization was removed by nitrogen blowing before the 3 hour heat soak at 185° F. The oil concentrate finally obtained was defective in that it had a low pH (4.8), a bad odor, and produced $H_2S$ in oil blends.

COMPARATIVE EXAMPLE III

The same product was prepared in a manner similar to that in the example, with the exception that the temperature and the times during the heat soaking step were as shown in the folowing table. The final oil concentrates had $H_2S$ demerits and hydrolytic stabilities as shown.

TABLE II

|   | Temp., °F. | Time, Hrs. | H₂S Demerit | Hydrolytic Stability, °F. |
|---|---|---|---|---|
| A | 140 | 2 | +5 | <200 |
| B | 140 | 6 | +5 | <200 |
| C | Same + 18 hrs. @ 78° F. | | 0 | <200 |
| D | 185 | 3 | 0 | >250 |

It can be seen that Product D made according to this invention was the most satisfactory one.

COMPARATIVE EXAMPLE IV

An oil concentrate product was prepared in the manner of the example, with the exception that before filtration of the neutralized acid, the product was dried by nitrogen stripping. The ultimate oil concentrate obtained was hazy. When this product that was dried before filtration had 2% water added and was refiltered, a clear oil concentrate was obtained.

Having described this invention, what is sought to be protected by Letters Patent is succinctly set forth in the following claims.

What is claimed is:

1. A process which comprises: forming a dialkyl dithiophosphoric acid by reacting a mixture of two monohydric alcohols having in the range of 3 to 6 carbon atoms per molecule within the range of 0.225 to 0.275 mole of phosphorus pentsulfide, per mole of alcohol, at a temperature in the range of 160 to 200° F. and for a time in the range of 1 to 6 hours while maintaing the specific gravity of the reaction mixture in the range of 1.015 to 1.035 and the color of the reaction mixture dark; cooling the dialkyl dithiophosphoric acid so obtained to a temperature below 110° F.; separating solids from the acid so cooled; neutralizing the acid within the range of 0.52 to 0.60 mole, per mole of acid, of a neutralizing agent selected from the group consisting of oxides and hydroxides of zinc, the neutralization being carried out at a temperature in the range of 140 to 200° F.; thereafter holding the neutralized reaction mixture having a water content of 0.5 to 4 weight percent at a temperature in the range of 150 to 200° F. and a pH in the range of 6.0 to 6.6 for a time in the range of 1 to 4 hours; diluting the neutralized product thus obtained within the range of 5 to 20 weight percent of a distillate oil having a viscosity in the range of 35 to 45 SSU at 210° F.; separating substantially completely all inorganic salts from the diluted neutralized product while maintaining the water content thereof in the range of 0.5 to 4 weight percent; and drying the filtered material to a water content of less than 0.5 weight percent to obtain a clear, odorless, hydrogen sulfide free oil solution of a dialkyl dithiophosphoric acid salt.

2. A process comprising reacting phosphorus pentasulfide with an aliphatic alcohol having in the range of 1 to 14 carbon atoms at a temperature in the range of 160–200° F. for a time in the range of 1–6 hours while maintaining the specific gravity of the reaction mixture in the range of 1.015 to 1.035 and the color of the reaction mixture dark; separating solids from the dark reaction product at temperatures below 110° F.; neutralizing the purified dark product with an inorganic metal containing neutralizing agent at a temperature in the range of 140 to 200° F.; heat-soaking the acid salt so obtained at a temperature in the range of 150 to 200° F. for a time in the range of 1 to 4 hours while maintaining the water content thereof in the range of 0.5 to 4 weight percent and the pH in the range of 6.0 to 6.6; then separating substantially completely all inorganic salts from the heat soaked acid salt while maintaining the water content thereof in the range of 0.5 to 4 weight percent and drying the solids-free acid salt to a water content of less than one weight percent to obtain a clear, odorless, hydrogen sulfide-free dialkyl dithiophosphoric acid salt.

3. A process which comprises reacting phosphorus pentasulfide with a monohydric aliphatic alcohol having in the range of 3 to 14 carbon atoms per molecule at a temperature in the range of 160 to 200° F. and for a time in the range of 1 to 6 hours while maintaining the specific gravity of the reaction mixture in the range of 1.015 to 1.035 to obtain a dark-colored dialkyl dithiophosphoric acid, separating solids from the dark-colored acid so obtained, neutralizing the purified dark-colored acid with a neutralizing agent selected from the group consisting of oxides and hydroxides of a metal from group II of the periodic table, heat-soaking the neutralized acid at a temperature in the range of 150 to 200° F. for a time in the range of 1 to 4 hours while maintaining the water content thereof in the range of 0.5 to 4 weight percent and the pH in the range of 6.0 to 6.6, then separating from the acid salt so obtained substantially completely all inorganic salts while maintaining the water content thereof in the range of 0.5 to 4 weight percent, and drying the purified acid salt to a water content of less than one weight percent.

4. The process of claim 3 wherein the acid salt is diluted within the range of 5 to 20 weight percent of a distillate oil after heat-soaking and before separation of the inorganic salts.

References Cited in the file of this patent

UNITED STATES PATENTS

| 2,466,408 | Funk | Apr. 5, 1949 |
| 2,680,123 | Mulvany | June 1, 1954 |
| 2,824,836 | Smith et al. | Feb. 25, 1958 |